Feb. 21, 1933. J. W. SWENDSEN 1,898,749
INDUCTION MOTOR WITH SHORT CIRCUITED SECONDARY
Filed Aug. 11, 1930
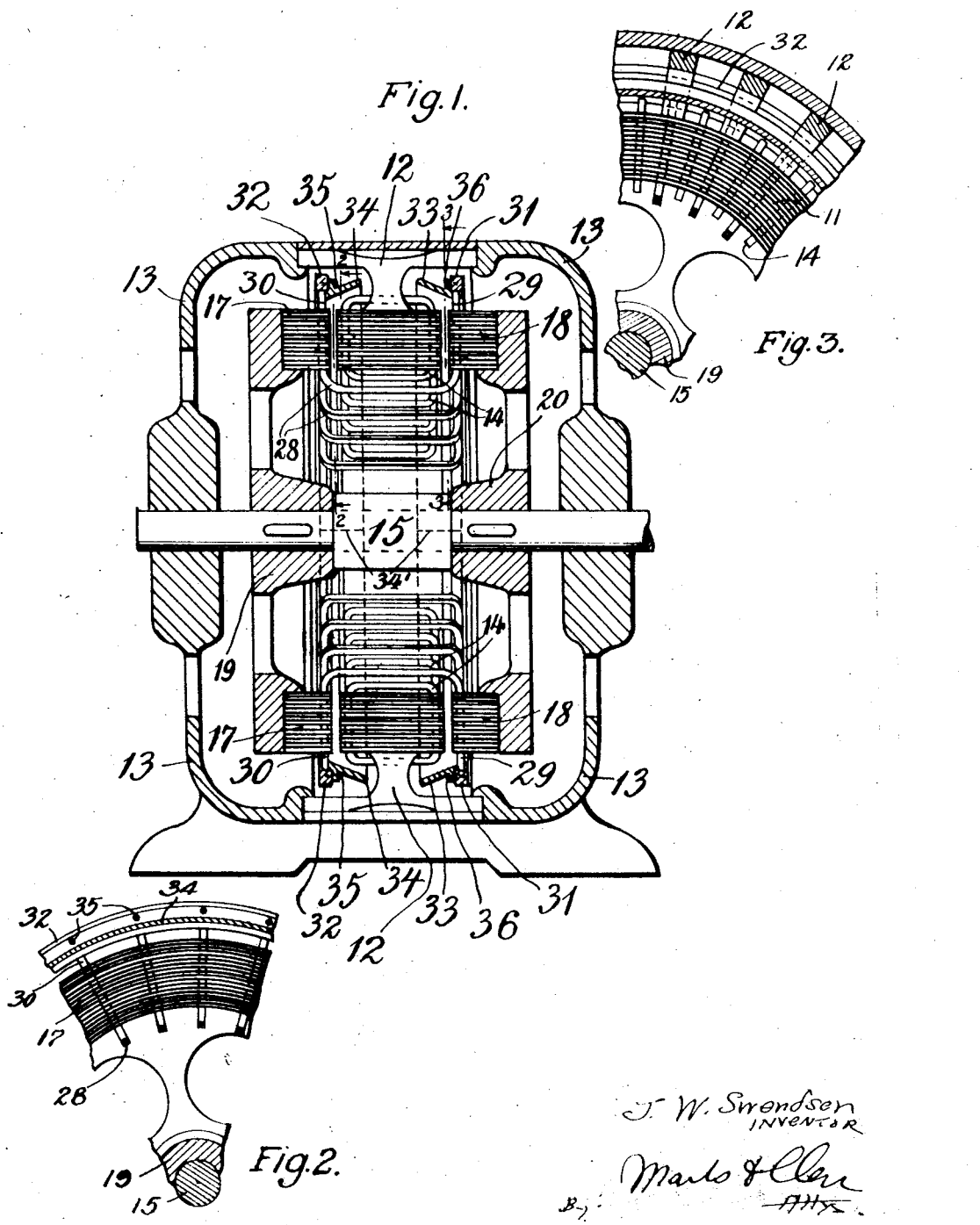

Patented Feb. 21, 1933

1,898,749

UNITED STATES PATENT OFFICE

JOHAN WALFRED SWENDSEN, OF OSLO, NORWAY

INDUCTION MOTOR WITH SHORT CIRCUITED SECONDARY

Application filed August 11, 1930, Serial No. 474,598, and in Germany September 19, 1929.

The present invention relates to an improved induction motor with short circuited secondary, and its object is to provide an especially desirable construction of said type of motor comprising a ring shaped stator, the iron core of which is manufactured by winding a long strip of metal into a coil, and two ring formed rotors, one on each side of the stator. In the construction of this type of motor disclosed in my prior application Serial Number 434,699 filed March 10, 1930, each rotor had a separate secondary circuit comprising radially disposed copper bars and short circuiting rings attached to the ends of the said bars on the inside and the outside of the rotor, or the bars were connected together in pairs with corresponding bars in the other rotor located on the other side of the stator by means of flexible leads. In the first case this arrangement necessitates the use of four short circuiting rings for each stator, which may result in an increase in the secondary copper, and also increase the losses, and on the other hand the heat developed in the inside rings may be hard to remove, and in the second case a rather complicated construction was provided, which may be unstable and cause trouble in dissatisfactory mechanical strength.

One object of the present invention is to provide a motor where the disadvantages above stated are avoided. According to this invention the short circuited bars of both rotors are made in one piece in the form of a U, and are arranged in the motor in such a way that the legs of the U-formed bars will go through one rotor each in a radial direction, and project outside the outer periphery of the rotors, while the base of the U on the inside of the stator connects the bars through each rotor together.

Cooperating with the U-shaped bars are short circuiting rings the latter being welded to the projecting ends of the legs of the U-formed bars on each side of the stator, and as these rings are located outside the outer periphery of the rotors, they will be exposed to the air and will easily be kept reasonably cool.

To further reduce the leakage from the outside periphery of the stator, ring formed shields may be arranged extending from the two short circuiting rings and inwards towards each other outside the outer periphery of the stator.

With the above construction the manufacture of the motor is very much simplified. The U-formed bars can be bent to shape before they are applied to the motor, and be mounted on the motor by being pushed in from the center of the rotors after these are mounted on the shaft.

In order that the invention shall be readily understood it will now be described with reference to the drawing illustrating a preferred embodiment of the invention, and in which:—

Fig. 1 is a vertical cross sectional view through the improved motor, parts being shown in section, Fig. 2 is a fragmentary longitudinal sectional detail on line 2—2 of Fig. 1 looking in the direction in which the arrow points, and Fig. 3 is a similar sectional view on line 3—3 of Fig. 1 looking in the direction in which the arrow points.

In the embodiment shown in the drawing the stator 11 is provided with a number of legs 12 which are fixed to the frame 13 of the motor. The stator is provided with copper windings 14 of any suitable type. In the drawing those copper windings are illustrated as ring windings. The motor frame 13 carries the shaft 15 which again supports the rotors 17 and 18 arranged on the shaft 15 by means of suitable hubs 19 and 20. The rotor elements 17 and 18 which are of the strip wound type are provided with apertures adapted to receive the U-formed short circuiting bars 28. A suitable number of U-formed bars may, as anybody will understand, be arranged with the legs projecting outside the periphery of the rotor elements and running substantially, radially towards the shaft 15. Beyond the periphery of each of the rotor elements 17 and 18 short circuiting rings 31 and 32 may be welded or fastened in any other suitable way to the ends of the U-shaped bars. Preferably the rings 31 and 32 are arranged far enough outside the rotor elements to provide air openings between the rings 31 and 32 and the rotor elements 17 and 18. These arrangements will, to a very great extent, provide for cooling effect to the rings 31 and 32. In order to reduce the leakage factor shields 33 and 34 are further arranged, each of these shields may consist of semicircular rings or cylinders as shown at 34' (Fig. 1), which by means of screws 35 and 36 or the like may be attached to the short circuiting rings 31 and 32 or to the free ends of the short circuiting bars. Incidentally it is to be noted that the rings project inwardly towards the radial plane through the center of the stator. Anybody will understand that the ring and the said shields may be combined with each other before the rings are attached to the ends of the bars and that they even may be produced as one piece together.

It will be understood that this invention is not limited to the above described details, as these have only been examples, whereby the invention may be readily understood by anybody skilled in the art.

I claim:

1. Induction motor with short-circuited secondary, comprising strip wound magnetic elements arranged with one stator between two rotor elements, substantially U-shaped secondary conductor bars, arranged with one leg on each side of the stator with the free ends projecting out of the periphery of the rotor elements and short-circuiting rings connecting the said bars with each other on each side of the stator.

2. Induction motor with short-circuited secondary, comprising strip wound magnetic elements arranged with one stator between two rotor elements, substantially U-shaped secondary conductor bars, arranged with one leg on each side of the stator with the free ends projecting out of the periphery of the rotor elements, short-circuiting rings connecting the said bars with each other on each side of the stator, and ring-like shields attached to the said rings and projecting inwardly towards a radial plane through the center of the said stator.

3. Induction motor with short-circuited secondary, comprising strip wound magnetic elements arranged with one stator between two rotor elements, substantially U-shaped secondary conductor bars, arranged with one leg on each side of the stator with the free ends projecting out of the periphery of the rotor elements, short-circuiting rings connecting the said bars with each other on each side of the stator, and ring like shields attached to the said rings and projecting inwardly towards a radial plane through the center of the said stator, said shields being formed in semi-circular sections.

In testimony whereof I have signed my name unto this specification.

JOHAN WALFRED SWENDSEN.